United States Patent
Bigo et al.

(10) Patent No.: US 6,549,697 B1
(45) Date of Patent: Apr. 15, 2003

(54) WAVELENGTH DIVISION MULTIPLEX OPTICAL SIGNAL REGENERATION METHOD

(75) Inventors: Sébastien Bigo, Palaiseau (FR); Roland Mestric, Paris (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/667,628

(22) Filed: Sep. 22, 2000

(30) Foreign Application Priority Data

Sep. 23, 1999 (FR) .......................................... 99 11873

(51) Int. Cl.$^7$ ................................................ G02B 6/28
(52) U.S. Cl. ........................ 385/24; 385/37; 359/124; 359/115; 359/127
(58) Field of Search .......................... 385/37, 24, 22, 385/15, 39, 45; 359/124, 127, 130, 135, 114, 115, 161

(56) References Cited

U.S. PATENT DOCUMENTS

| | | | | |
|---|---|---|---|---|
| 4,890,893 A | * | 1/1990 | Smoot | 359/124 |
| 5,278,855 A | * | 1/1994 | Jacobovitz-Veselka et al. | 372/11 |
| 5,367,589 A | * | 11/1994 | MacDonald et al. | 385/37 |
| 5,414,548 A | * | 5/1995 | Tachikawa et al. | 359/115 |
| 5,473,719 A | * | 12/1995 | Stone | 359/124 |
| 5,532,861 A | * | 7/1996 | Pirio et al. | 359/161 |
| 5,703,708 A | * | 12/1997 | Das et al. | 250/227.12 |
| 5,726,787 A | * | 3/1998 | Haus et al. | 359/131 |
| 5,953,142 A | * | 9/1999 | Chiaroni et al. | 250/227.12 |
| 6,137,604 A | * | 10/2000 | Bergano | 359/124 |
| 6,141,127 A | * | 10/2000 | Boivin et al. | 250/227.12 |
| 6,373,608 B1 | * | 4/2002 | Desurvire et al. | 359/158 |

FOREIGN PATENT DOCUMENTS

| | | |
|---|---|---|
| EP | 0 657 754 A1 | 6/1995 |
| EP | 1 014 607 A1 | 6/2000 |

OTHER PUBLICATIONS

Inoue, K.: "Suppression Technique for Fiber Four–Wave Mixing Using Optical Multi–/Demultiplexers and a Delay Line" Journal of Lightwave Technology, US, IEEE., New York, vol. 11, No. 3, Mar. 1, 1993, pp. 455–461, XP000577337 ISSN: 0733–8724.

Tsuda, H. et al.: "2.4 BRIT/S All–Optical Pulse Discrimination Experiment Using A High–Speed Saturable Absorber Optical Gate" Electronics Letters, GB, IEEE Stevenage, vol. 32, No. 4, Feb. 15, 1996, pp. 365–366, XP000558157 ISSN: 0013–5194.

* cited by examiner

Primary Examiner—Hemang Sanghavi
Assistant Examiner—Scott Knauss
(74) Attorney, Agent, or Firm—Sughrue Mion, PLLC

(57) ABSTRACT

A wavelength division multiplex optical signal regenerator is inserted between two optical fiber sections of a wavelength division multiplex fiber optic transmission system including a transmission line made up of a plurality of optical fiber sections and providing N channels at different wavelengths where N is an integer greater than 1. The regenerator includes a demultiplexer for demultiplexing wavelength division multiplexed optical signals onto N individual channels, and a multiplexer for multiplexing optical signals at the output of the N individual channels into multiplexed optical signals. Each individual channel includes a saturable absorber for reshaping the optical signals of each channel, and a delay line. The length of each delay line is chosen to introduce a total delay τn" between the (n+1)th channel and the nth channel to obtain a time shift of τn between the (n+1)th channel and the nth channel.

18 Claims, 4 Drawing Sheets

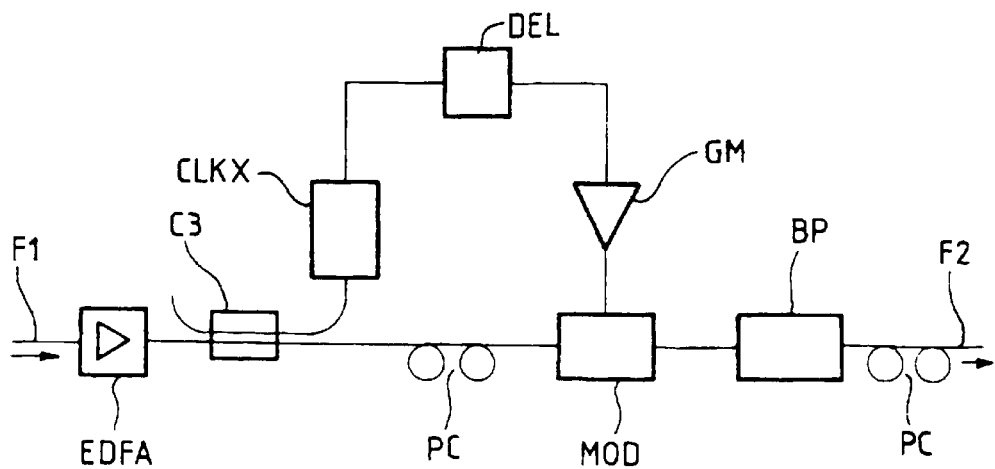
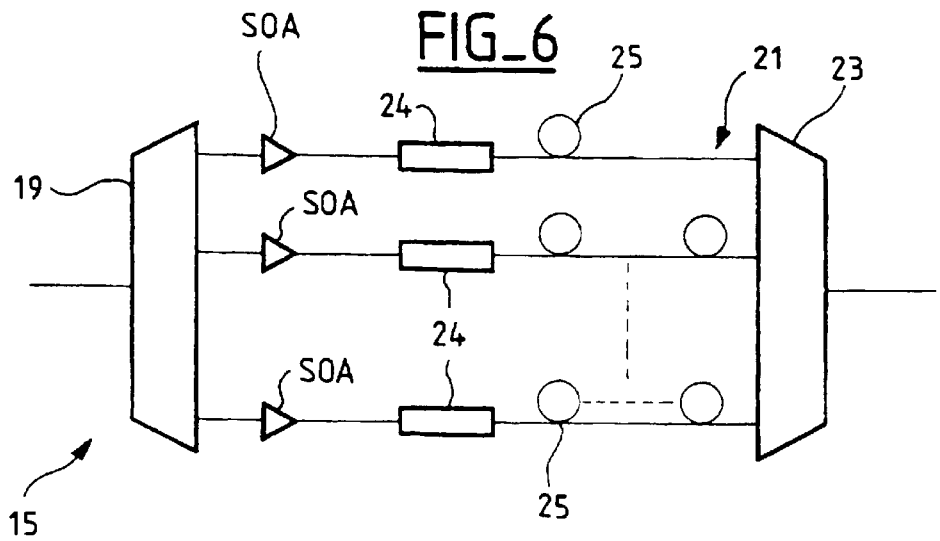

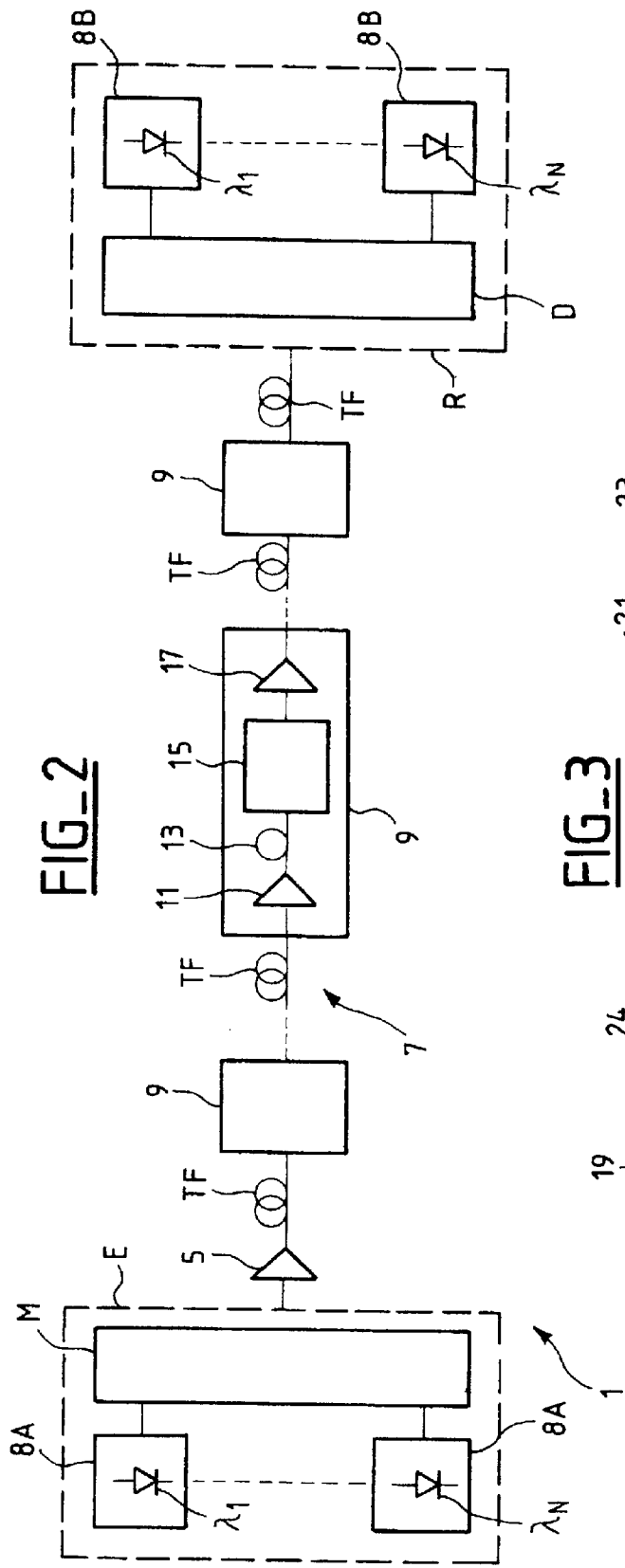

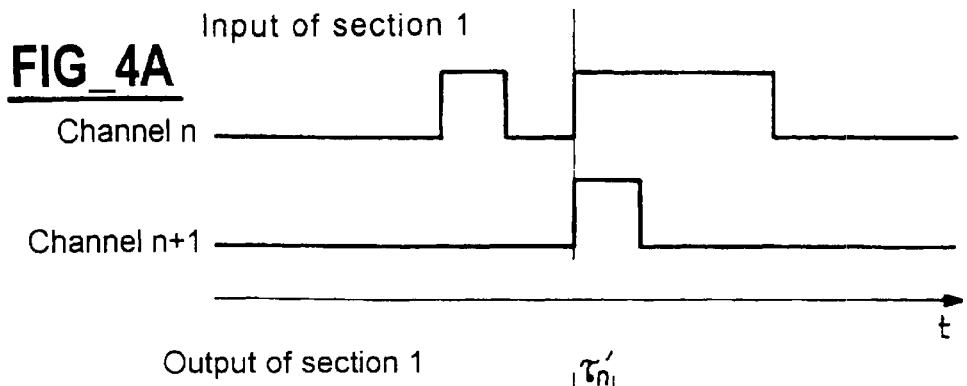
FIG_4A
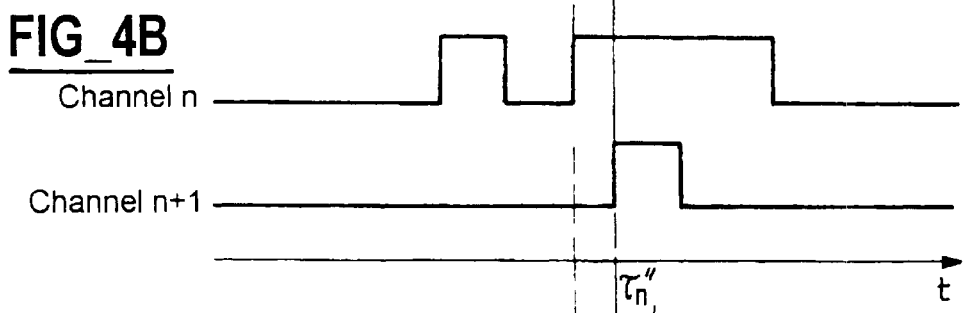
FIG_4B
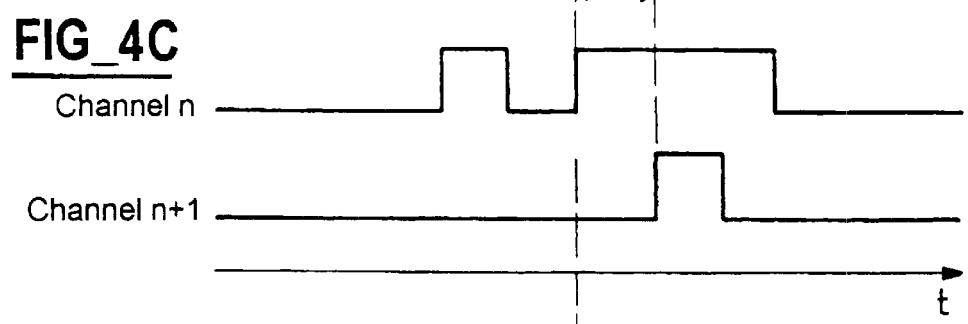
FIG_4C
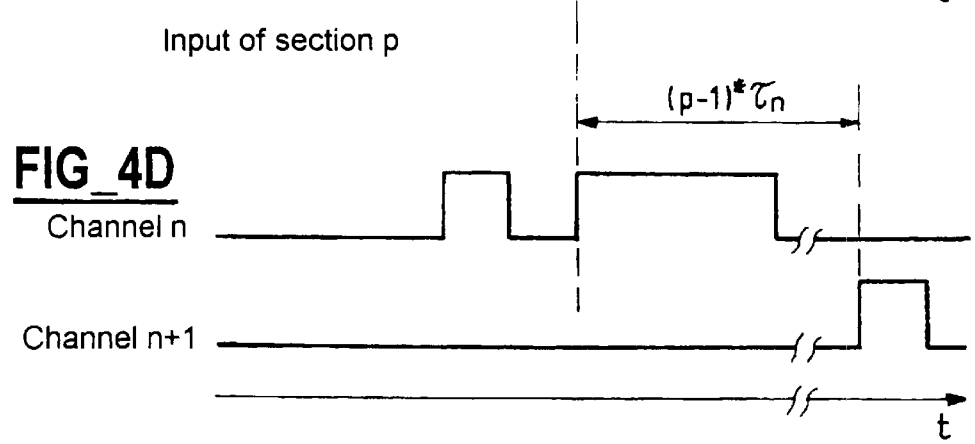
FIG_4D

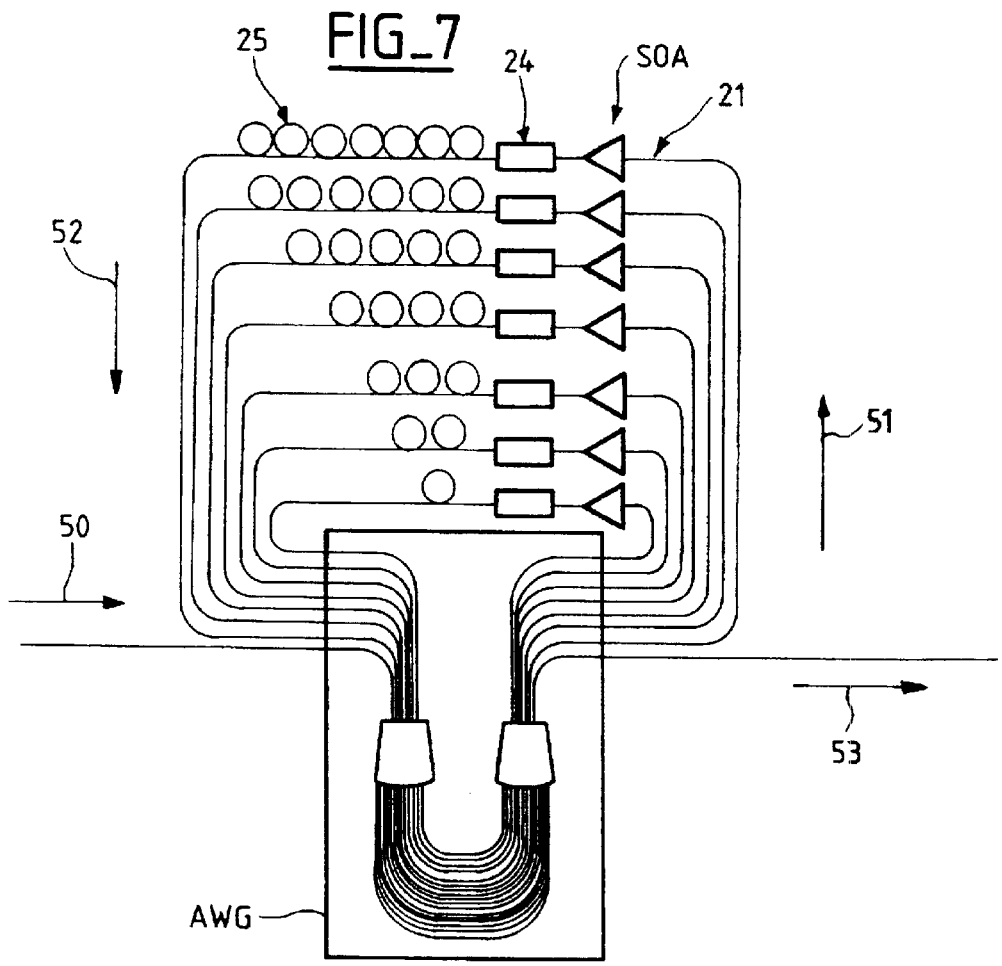
FIG_7
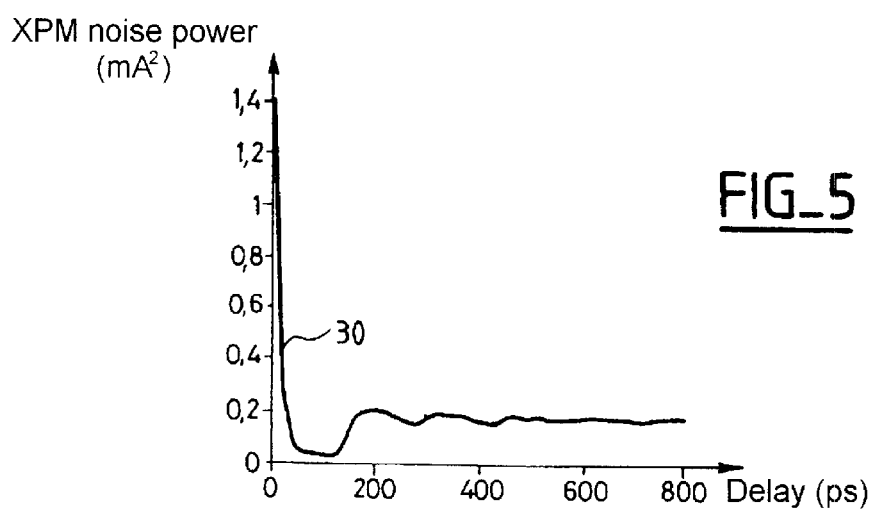
FIG_5

WAVELENGTH DIVISION MULTIPLEX OPTICAL SIGNAL REGENERATION METHOD

BACKGROUND OF THE INVENTION

1. Field of the Invention

The present invention relates to a method of regenerating wavelength division multiplex optical signals.

2. Description of the Prior Art

Total mastery of the wavelength division multiplex (WDM) fiber optic transmission technology is an important factor in meeting the growing requirement for very high bit rates for transmitting data.

Wavelength division multiplexing (WDM) combines onto one fiber a plurality of modulated channels with different carrier frequencies. The global bit rate of a transmission line is therefore equal to the sum of the bit rates of the various channels.

However, WDM optical signals are subject to limitations which reduce the propagation distance and affect the quality of the optical signals transmitted.

Such limitations include, in particular:

- line losses,
- jitter (uncertainty in the timing of the arrival of bits),
- accumulation of spontaneous amplification emission noise, in particular in in-line optical amplifiers such as erbium-doped fiber amplifiers, and
- non-linear effects, such as phase automodulation or cross phase modulation.

Line losses are generally compensated by in-line optical amplification of the WDM signals, for example using an erbium-doped fiber amplifier (EDFA).

However, in-line amplification in itself cannot alleviate the other limiting factors mentioned above. These remain or are even simulated by in-line optical amplification, for example the accumulation of noise.

This is why it is necessary to regenerate the optical signals at regular intervals. Regeneration entails applying various processes to the optical signals, such as:

- retiming the optical signals to prevent jitter,
- reshaping the optical signals to their original envelope, which also entails eliminating noise, and
- reamplifying the optical signals to their original amplitude levels.

A regenerator that performs the above three actions on an optical signal is usually referred to as a 3R regenerator (Retiming, Reshaping, Reamplifying). One which performs only the first two actions is referred to as a 2R regenerator (Retiming, Reshaping).

For example, the document Nakazawa et al. (1991), "Experimental demonstration of soliton data transmission over unlimited distances with soliton control in time and frequency domain", Electronics Letters, V. 29, No 9, pp. 729–730, Apr. 29, 1993 discloses a regenerator acting on optical signals in the form of solitons through an $LiNO_3$ optical modulator.

The prior art modulator, which is shown diagrammatically in FIG. 1, synchronously modulates incoming optical signals.

To this end, the $LiNO_3$ modulator is controlled by an electronic control signal generated from the in-line optical signal in a clock circuit. The clock recovery means include an optical coupler C3 for extracting part of the optical signal propagating between the input F1 and the output F2, a clock extractor circuit CLKX, a delay line supplying a delay DEL, and an amplifier GM supplying the control power needed for the $LiNO_3$ modulator MOD to operate. FIG. 1 also shows an input optical amplifier (EDFA) for alleviating the insertion losses of the regenerator circuit, a birefringent polarization control (PC) system and a band-pass filter (BP) for tightening the spectral distribution of the energy of the optical signals.

The prior art regeneration system has the disadvantage of requiring a clock recovery circuit, which is a costly component that cannot be integrated.

The problem arises even more acutely in the case of WDM signals, which require a regenerator, and consequently a clock signal recovery circuit, for each channel.

The present invention aims to alleviate the problems referred to above by proposing a WDM signal regenerator with no optical or electronic circuits for recovering the clock signal of the various WDM signals.

SUMMARY OF THE INVENTION

To this end, the invention provides a wavelength division multiplex optical signal regenerator adapted to be inserted between two optical fiber sections of a wavelength division multiplex fiber optic transmission system including a transmission line made up of a plurality of optical fiber sections and providing N channels at different wavelengths where N is an integer greater than 1, which regenerator includes:

- a demultiplexer for demultiplexing wavelength division multiplexed optical signals onto N individual channels, and
- a multiplexer for multiplexing optical signals at the output of the N individual channels into multiplexed optical signals, wherein each individual channel includes:
  - a saturable absorber for reshaping the optical signals of each channel, and
  - a delay line, and wherein the length of each delay line is chosen to introduce a total delay $\tau n"$ between the (n+1)th channel and the nth channel to obtain a time shift of $\tau n$ between the (n+1)th channel and the nth channel at the output of the regenerator relative to the input of the optical fiber section of the transmission system, intended to be directly upstream of the regenerator, where $\tau n$ is greater than zero.

We have surprisingly found that in a wavelength division multiplex fiber optic transmission system cross phase modulation (XPM) is the dominant phenomenon contributing to the jitter (uncertainty in the timing of the arrival of bits).

XPM is a multichannel effect in which phase modulation of one channel is induced by the intensity of the signal in one or more adjoining channels. This phenomenon therefore leads to distortion of the intensity of the signal to be transmitted through group velocity dispersion (GVD) and to uncertainty in the timing of the arrival of bits.

The regenerator as defined above introduces different delays into the individual optical signal channels to reduce XPM effectively, or even to eliminate it completely, which therefore considerably reduces jitter.

Thanks to the regenerators according to the invention, active retiming of the optical signals using regenerators which have a clock signal recovery circuit can be greatly reduced or even eliminated.

What is more, the regenerator according to the invention as defined above has the advantage that it can be integrated in a compact manner into a single component with a simpler configuration than regenerators with a clock signal recovery circuit.

The regenerator according to the invention can further include one or more of the following features:

τn has a value chosen to be less than a value eliminating the correlation of the intensity distortion contributions of each fiber section of the transmission system, τn=τ for all the channels, the time shift τ is less than approximately 600 ps, the time shift τ is chosen to obtain destructive interference between the various distortion contributions of the individual optical fiber sections of the wavelength division multiplex fiber optic transmission system, the shift τ is from approximately T/10 to approximately 1.5T where T is the duration of a bit, the time shift τ is from approximately 5 ps to approximately 200 ps, the multiplexer and the demultiplexer take the form of a combined multiplexing and demultiplexing unit with an array of waveguides in rows in which the saturable absorbers and the delay lines are disposed in the feedback loops, and it includes a semiconductor optical amplifier in each channel in series with the saturable absorber.

The invention further proposes a wavelength division multiplex fiber optic transmission system comprising a transmission line formed of a plurality of optical fiber sections with a regenerator disposed between two optical fiber sections and wherein most regenerators of said system are regenerators according to the invention.

Other features and advantages of the invention will emerge from the following description, which is given by way of non-limiting example and with reference to the accompanying drawings.

BRIEF DESCRIPTION OF THE DRAWINGS

FIG. 1, already explained is a block diagram of a prior art optical signal regenerator.

FIG. 2 is a block diagram of a transmission system equipped with regenerators according to the invention.

FIG. 3 is a block diagram of part of a repeater module shown in FIG. 2.

FIGS. 4A, 4B, 4C and 4D show the time shift between two channels n and n+1 at different locations of the transmission system to illustrate how the regenerator according to the invention works.

FIG. 5 is a graph showing the result of digital simulation of the "XPM reduction" aspect of a regenerator according to the invention.

FIG. 6 is a first variant of the FIG. 3 diagram.

FIG. 7 is a second variant of the FIG. 3 diagram.

DETAILED DESCRIPTION OF THE PREFERRED EMBODIMENTS

FIG. 2 is a block diagram of a wavelength division multiplex fiber optic data transmission system 1.

The system 1 comprises, disposed in line, an optical transmitter E of wavelength division multiplex Z optical signals, a first optical driver amplifier 5, a multiplexed optical signal fiber optic transmission line 7 and an optical receiver R.

The transmitter E comprises a plurality of optical sources 8A adapted to transmit optical signals having respective wavelengths $\lambda_1, \lambda_2, \ldots \lambda_n \ldots \lambda_N$ (n is an integer between 1 and N, where N is any natural number), each of which therefore defines a transmission channel with a carrier of associated wavelength, and a multiplexer M for feeding the optical signals into the transmission line 7.

Symmetrically, the optical receiver R comprises a demultiplexer D and a plurality of detectors 8B adapted to receive the optical signals with respective wavelengths $\lambda_1, \lambda_2, \ldots \lambda_N$.

The transmission line 7 comprises K sections TF of a transmission optical fiber (K is a natural number). Each section TF is a standard single mode fiber (SMF) typically having a dispersion of 17 ps/nm.km and is approximately 100 km long, for example.

Between each section TF and the next is a repeater module 9 comprising, in line, a first optical amplifier 11, for example of the Erbium-Doped Fiber Amplifier (EDFA) type, a dispersion compensated fiber (DCF) portion 13, to reduce the GVD, a regenerator 15 and a second optical amplifier 17, which can also be of the erbium-doped fiber amplifier (EDFA) type.

Refer now to FIG. 3, which is a more detailed block diagram of a first embodiment of the regenerator 15.

FIG. 3 shows that the regenerator 15 comprises a demultiplexer 19 with one input and N outputs, a set of N optical fiber lines 21 in parallel corresponding to the N transmission channels, and a multiplexer 23 with N inputs and one output.

Each of the optical fiber lines includes, firstly, a saturable absorber 24 and, secondly, an optical delay line 25.

The saturable absorbers 24 are preferably quaternary semiconductor components, such as $In_xGa_{1-x}As_yP_{1-Y}$ components. The component is either of the solid type or of the thin-film (quantum well) type.

A saturable absorbent component absorbs low amplitudes and passes high amplitudes. It therefore reshapes the incoming optical signals and filters the noise contained in the lower parts of the pulse, i.e the component absorbs noise for the low amplitudes of the signal.

A thin film (i.e. quantum well) saturable absorbent component is described, for example, in the article "2.4 Gbit/sec all optical discrimination experiment using a high speed saturable absorber optical gate" by H. Tsuda and others—Electronic Letters of Feb. 15, 1996, Vol. 32; n DEG 4, pages 365 and 366.

The optical delay lines 25 are chosen to introduce between the channels a time-delay such that the (n+1)th and nth channels are shifted $\tau_n$ at the output of the regenerator 15 relative to the fiber section TF directly upstream of the regenerator 15.

To illustrate the action of the delay lines 25 of the regenerator 15, FIGS. 4A, 4B, 4C and 4D show, by way of example, the time shifting of two sequences of bits respectively transmitted on channel n and on channel n+1 at different locations of the transmission system 1.

FIG. 4A shows that the sequence of bits on channel n is 10111 while that on channel n+1 is 00100. The sequences of bits are synchronized at the entry of the first fiber section TF to illustrate the operating principle of the regenerator better.

At the exit from the first fiber section TF the two sequences are temporally shifted because of the chromatic dispersion in the fiber section (see FIG. 4B). The DCF portion 13 in the repeater module 9 reduces the dispersion between the two channels n and n+1 to a value $\tau_n'$.

Then, allowing for the time shifting of the two sequences at its input, the regenerator 15 introduces an additional shift $\tau_n''$ between the sequences, by means of delay lines 25, so that the sequences of the channels n and n+1 are shifted by $\tau_n$ at the output of the regenerator 15, i.e. at the entry of the second fiber section, relative to the entry of the first fiber section TF (see FIG. 4C).

Thus each regenerator 15 in the transmission line 7 introduces a shift so that at the entry of section p, i.e. at the output of the (p−1)th regenerator, the two sequences are shifted by $(p-1) \times \tau_n$ relative to the entry of the first optical fiber section TF of the transmission system 1. This allows for the contribution of all fiber section TF to the XPM and effectively reduces the XPM and consequently the jitter.

$\tau_n$ is preferably greater than 0 and less than a value eliminating the correlation of the intensity distortion contributions of the various fiber sections TF.

A value is advantageously chosen for all the channels such that $\tau_n = \tau$ and $\tau$ is greater than 5 ps and less than approximately 600 ps.

The XPM can be reduced further if the time shift $\tau$ is chosen to achieve destructive interference between the various distortion contributions of the optical fiber sections TF. In this case, the XPM can be reduced by a factor of approximately $K^2$.

To this end, the time shift $\tau$ is fixed so that it is from approximately T/10 to approximately 1.5T, where T is the duration of a bit.

The time shift $\tau$ is typically from 5 ps to 200 ps.

FIG. 5 is a graph showing the result of digital simulation of a transmission system as described with reference to FIGS. 2 and 3 with ten 100 km SMF sections but with no saturable absorber. It illustrates the "XPM reduction" aspect, of the regenerator according to the invention. The time shift or delay $\tau$ in ps between two adjacent channels is plotted on the abscissa axis and the XPM noise power in $mA^2$ is plotted on the ordinate axis.

The curve 30 in FIG. 5 shows clearly that the XPM noise can be effectively reduced for a value of $\tau$ less than 600 ps, i.e. if the correlation between the distortion contributions of the individual sections TF is maintained, and is minimum if T is from 5 ps to 200 ps.

The greater the XPM, the greater the efficiency of the XPM reduction unit 15. This is the case in non zero dispersion shift fiber (NZDSF), for example, which has a dispersion of 2 ps/nm.km to 3 ps/nm.km, regardless of the sign.

In an advantageous variant shown in FIG. 6, each line 21 includes a semiconductor optical amplifier (SOA) in series with and preferably upstream of the saturable absorber. The SOA compensates losses due to the regenerator itself, in particular losses due to the multiplexer and the demultiplexer.

In another advantageous variant of the invention, shown in FIG. 7, the multiplexer and the demultiplexer of the regenerator 15 are in the form of a combined arrayed waveguide grating (AWG) multiplexing/demultiplexing unit with the saturable absorbers and the delay lines in the feedback loops.

The document JP 7 098 424A discloses a combined multiplexing and demultiplexing unit with an array of waveguides in rows in which the optical signal processing means are disposed in feedback loops.

The arrow 50 in FIG. 7 indicates the direction of propagation of the WDM input signal in the AWG unit. As is known in the art, the incoming WDM optical signal is demultiplexed in the AWG unit. The demultiplexed optical signals then propagate in the direction of the arrow 51 in the lines 21 which form the feedback loops of the AWG unit. As already explained in connection with FIG. 5, each line 21 includes a semiconductor optical amplifier (SOA), a saturable absorber 24 and delay lines 25, as described above.

The optical signals regenerated in this way are then returned to the input of the AWG unit (arrow 52) for multiplexing in a manner known in the art to produce at the output a regenerated WDM optical signal whose propagation direction is indicated by the arrow 53.

Except for the demultiplexing/multiplexing originally performed in a single AWG unit, this embodiment works in the same way as the embodiment shown in FIG. 6.

The FIG. 7 variant has the advantage that it can be fully integrated.

Note also that the regenerator according to the invention can considerably reduce interaction between channels due to stimulated Raman scattering or fourwave mixing (FWM).

It is therefore clear that the regenerator according to the invention, by eliminating XPM by means of the delay lines and reshaping the optical signals using saturable absorbers, performs regeneration without any complex clock signal recovery circuit.

Depending on the length of the transmission line of the fiber optic transmission system, it is possible to dispense completely with regenerators which have a clock recovery circuit. However, for very large propagation distances it may be judicious to use a combined transmission system (using regenerators according to the invention and regenerators with a clock circuit recovery circuit), which nevertheless considerably reduces the number of standard regenerators with a clock circuit recovery circuit, so contributing to the reliability and the reduced acquisition and maintenance cost of the transmission system.

What is claimed is:

1. A wavelength division multiplex optical signal regenerator adapted to be inserted between first upstream and second downstream optical fiber sections of a wavelength division multiplex fiber optic transmission system, comprising:

a demultiplexer demultiplexing wavelength division multiplexed optical signals into N individual channels, where N is an integer greater than 1, and a multiplexer multiplexing optical signals at the output of said N individual channels into multiplexed optical signals;

wherein each individual channel includes:

a saturable absorber reshaping the optical signals of each channel, and means for reducing cross phase modulation;

wherein the means for reducing cross phase modulation includes in each said channel a delay line downstream from the saturable absorber, and having a length such that $\tau_n = \tau_n' + \tau_n''$, where:

$\tau_n$ is a nonzero delay, between the (n+1)th channel and the nth channel, at the output of the delay line, $\tau_n'$ is a delay, between the (n+1)th channel and the nth channel, at the input of the delay line, and $\tau_n''$ is a delay, between the (n+1)th channel and the nth channel, introduced by the delay line.

2. The regenerator claimed in claim 1 wherein $\tau_n$ has a value chosen to be less than a value eliminating the correlation of the intensity distortion contributions of each fiber section of the transmission system.

3. The regenerator claimed in claim 1 wherein the time shift $\tau_n$ for each of the channels has an identical time shift value, $\tau$, for all the channels.

4. The regenerator claimed in claim 3 wherein said time shift $\tau$ is less than approximately 600 ps.

5. The regenerator claimed in claim 2 wherein said time shift $\tau$ is chosen to obtain destructive interference between the various distortion contributions of the individual optical fiber sections of the wavelength division multiplex fiber optic transmission system.

6. The regenerator claimed in claim 4 wherein said time shift $\tau$ is from approximately T/10 to approximately 1.5T where T is the duration of a bit.

7. The regenerator claimed in claim 5 wherein said time shift $\tau$ is from approximately 5 ps to approximately 200 ps.

8. The regenerator claimed in claim 1 wherein said multiplexer and said demultiplexer are a combined multiplexing and demultiplexing unit having feedback loops, with an array of waveguides in rows, in which said saturable absorbers and said delay lines are disposed in the feedback loops.

9. The regenerator claimed in claim 1 including a semiconductor optical amplifier in each channel in series with the saturable absorber.

10. A wavelength division multiplex fiber optic transmission system comprising a transmission line formed of a plurality of optical fiber sections with a regenerator disposed between two optical fiber sections and wherein one or more of the regenerators of said system are regenerators according to claim 1.

11. A wavelength division multiplex fiber optic transmission system with a repeater module adapted to be inserted between two optical fiber sections of a wavelength division multiplex fiber optic transmission system including a transmission line comprising:

N channels at different wavelengths, where N is an integer greater than 1;

optical amplifiers for amplifying received signal from the transmission line;

a plurality of optical fiber sections; and a plurality of repeater modules, each having amplifiers, dispersion compensation fiber and a regenerator;

wherein said regenerator comprises an optical delay line for each individual channel, a demultiplexer demultiplexing wavelength division multiplexed optical signals into N individual channels and a multiplexer multiplexing optical signals at the output of said N individual channels into multiplexed optical signals;

wherein each of said delay line introduce a total delay of the length $\tau_n''$ between the (n+1)th channel and the nth channel so that a time shift of $\tau_n$ between the (n+1)th channel and the nth channel at the output of said regenerator relative to the input of the optical fiber section of the transmission system directly upstream of said regenerator, where $\tau_n$ is greater than zero and includes the delay $\tau_n''$ and a delay $\tau_n'$ introduced by a chromatic dispersion in said fiber section.

12. The system claimed in claim 11 wherein $\tau_n$ has a value chosen to be less than a value eliminating the correlation of the intensity distortion contributions of each fiber section of the transmission system.

13. The system claimed in claim 11 wherein the time shift $\tau_n$ for each of the channels has an identical time shift value, $\tau$, for all the channels.

14. The system claimed in claim 13 wherein said time shift $\tau$ is less than approximately 600 ps.

15. The system claimed in claim 12 wherein said time shift $\tau$ is chosen to obtain destructive interference between the various distortion contributions of the individual optical fiber sections of the wavelength division multiplex fiber optic transmission system.

16. The system claimed in claim 14 wherein said time shift $\tau$ is from approximately T/10 to approximately 1.5T where T is the duration of a bit.

17. The system claimed in claim 15 wherein said time shift $\tau$ is from approximately 5 ps to approximately 200 ps.

18. The system claimed in claim 11 wherein said multiplexer and said demultiplexer are a combined multiplexing and demultiplexing unit having feedback loops, with an array of waveguides in rows, in which said delay lines are disposed in the feedback loops.

* * * * *